(12) United States Patent
Gaubatz et al.

(10) Patent No.: US 7,801,299 B2
(45) Date of Patent: Sep. 21, 2010

(54) TECHNIQUES FOR MERGING TABLES

(75) Inventors: Gunnar Gaubatz, Worcester, MA (US);
William C. Hasenplaugh, Jamaica Plain, MA (US); Bradley A. Burres, Waltham, MA (US); Wajdi Feghali, Boston, MA (US); Kirk Yap, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 992 days.

(21) Appl. No.: 11/534,330

(22) Filed: Sep. 22, 2006

(65) Prior Publication Data
US 2008/0075278 A1 Mar. 27, 2008

(51) Int. Cl.
*H04L 9/30* (2006.01)
(52) U.S. Cl. ........................................ 380/28
(58) Field of Classification Search .................. 380/28, 380/30
See application file for complete search history.

(56) References Cited
U.S. PATENT DOCUMENTS
6,480,501 B1 * 11/2002 Blanc et al. ................. 370/422

2003/0091036 A1 * 5/2003 Milliken et al. ............. 370/354

FOREIGN PATENT DOCUMENTS

| KR | 10-2005-0092576 | 9/2005 |
|---|---|---|
| KR | 10-2005-0092698 | 9/2005 |
| KR | 10-2005-0120460 | 12/2005 |
| WO | 2008/036940 A2 | 3/2008 |

OTHER PUBLICATIONS

"International Search Report and Written Opinion", PCT/US2007/079229, (Mar. 18, 2008), 10 pages.
International Preliminary Report on Patentability for PCT Patent Application No. PCT/US2007/079229, mailed on Apr. 2, 2009, 6 pages.

* cited by examiner

*Primary Examiner*—Kambiz Zand
*Assistant Examiner*—Aubrey H Wyszynski
(74) *Attorney, Agent, or Firm*—Glen B Choi

(57) ABSTRACT

Techniques are described herein to overlay and merge any number of tables of equivalent size and structure. Bits or patterns of bits that are similar among tables may be set to a voltage value representative of respective logical '0' or '1'. The bits that are different among the tables may be connected to either the value of a table selection signal or its inverse.

19 Claims, 5 Drawing Sheets

TECHNIQUES FOR MERGING TABLES

FIELD

The subject matter disclosed herein relates to merging tables.

RELATED ART

Look-up-tables are used for a variety of purposes. For example, rather than compute information on-the-fly, information can be stored in look-up-tables for quicker availability. However, look-up-tables can require large amounts of memory. In memory constrained environments, it may not be possible to store look-up-tables as desired.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Advanced Encryption Standard (AES) was adopted by National Institute of Standards and Technology (NIST) as US FIPS PUB 197 in November 2001. A substitution box (S-box) can be used to convert m number of input bits into n number of output bits. An m×n S-box may be implemented at least in part as a lookup table. S-boxes can be used in other cryptography environments to encrypt or decrypt information such as but not limited to data encryption standard (DES), MARS, CAST-128/256, Blowfish, Twofish, and Serpent. The S-Box in the AES block cipher can be one of the most time and area consuming operations. Area may be the physical silicon space used to implement an operation and can be correlated with a number of transistors.

The encryption and decryption procedures may perform the exact opposite steps in one or more rounds. With regard to the S-Box technique, encryption may produce $y=A(x^{-1})+b$ over the finite field $GF(2^8)$, whereas decryption may determine the inverse operation $x=(A^{-1}(y-b))^{-1}$ when both x and y are 8-bit variables, b is a constant 8-bit vector, and A is an 8×8-bit binary matrix. A look-up table based implementation for S-box may use two tables with completely different content. Some embodiments of the present invention can be used to combine multiple look-up-tables used for encryption and decryption where the substitution function (S-Box) has different or similar contents in either encryption or decryption mode and the tables are not accessed at the same time.

Although not a necessary feature of any embodiment, the silicon area used for high-speed AES implementations can be reduced significantly. The impact on reducing silicon real estate may be significant because the S-Box can be the largest silicon area using component in AES logic.

Figure 1:
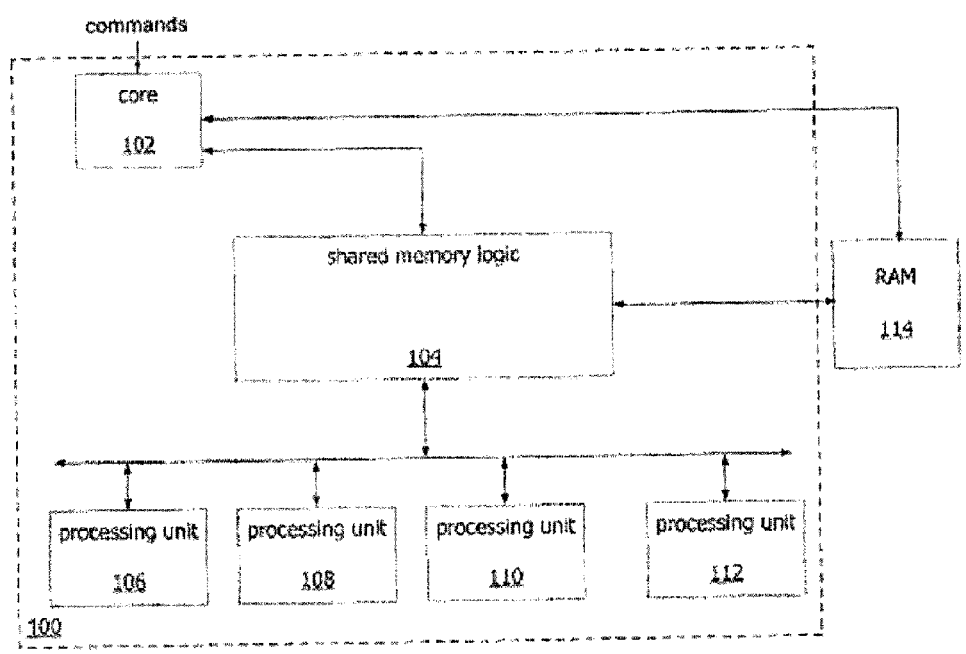
FIG. 1 shows an example system, in accordance with some embodiments of the present invention.

FIG. 1 depicts a sample implementation of a system component 100 capable to perform cryptographic operations. The component 100 can be integrated into a variety of systems. For example, the component 100 can be integrated within the die of a processor or found within a processor chipset. The system component 100 can off-load a variety of cryptographic operations from other system processor(s). The component 100 provides high performance at relatively modest clock speeds and can be area efficient.

As shown, the sample component 100 may be integrated on a single die that includes multiple processing units 106-112 coupled to shared memory logic 104. The shared memory logic 104 includes memory that can act as a staging area for data and control structures being operated on by the different processing units 106-112. For example, data may be stored in memory and then sent to different processing units 106-112 in turn, with each processing unit performing some task involved in cryptographic operations and returning the, potentially, transformed data back to the shared memory logic 104.

The processing units 106-112 are constructed to perform different operations involved in cryptography such as encryption, decryption, authentication, and key generation. For example, processing unit 106 may perform hashing algorithms (e.g., MD5 (Message Digest 5) and/or SHA (Secure Hash Algorithm)) while processing unit 110 performs cipher operations (e.g., DES (Data Encryption Standard), 3DES (Triple DES), AES (Advanced Encryption Standard), RC4 (ARCFOUR), and/or Kasumi).

As shown, the shared memory logic 104 is also coupled to a RAM (random access memory) 114. In operation, data can be transferred from the RAM 114 for processing by the processing units 106-112. Potentially, transformed data (e.g., encrypted or decrypted data) is returned to the RAM 114. Thus, the RAM 114 may represent a nexus between the component 100 and other system components (e.g., processor cores requesting cryptographic operations on data in RAM 114). The RAM 114 may be external to the die hosting the component 100.

The sample implementation shown includes a programmable processor core 102 that controls operation of the component 100. As shown, the core 102 receives commands to perform cryptographic operations on data. Such commands can identify the requesting agent (e.g., core), a specific set of operations to perform (e.g., cryptographic protocol), the data to operate on (e.g., the location of a network protocol unit payload), and additional cryptographic context data such as a cryptographic key, initial vector, and/or residue from a previous cryptographic operation. As used herein, a "network protocol unit" may include any packet or frame or other format of information with a header and payload portions formed in accordance with any protocol specification. In response to a command, the core 102 can execute program instructions that transfer data between RAM 114, shared memory, and the processing units 106-112.

Figure 2:
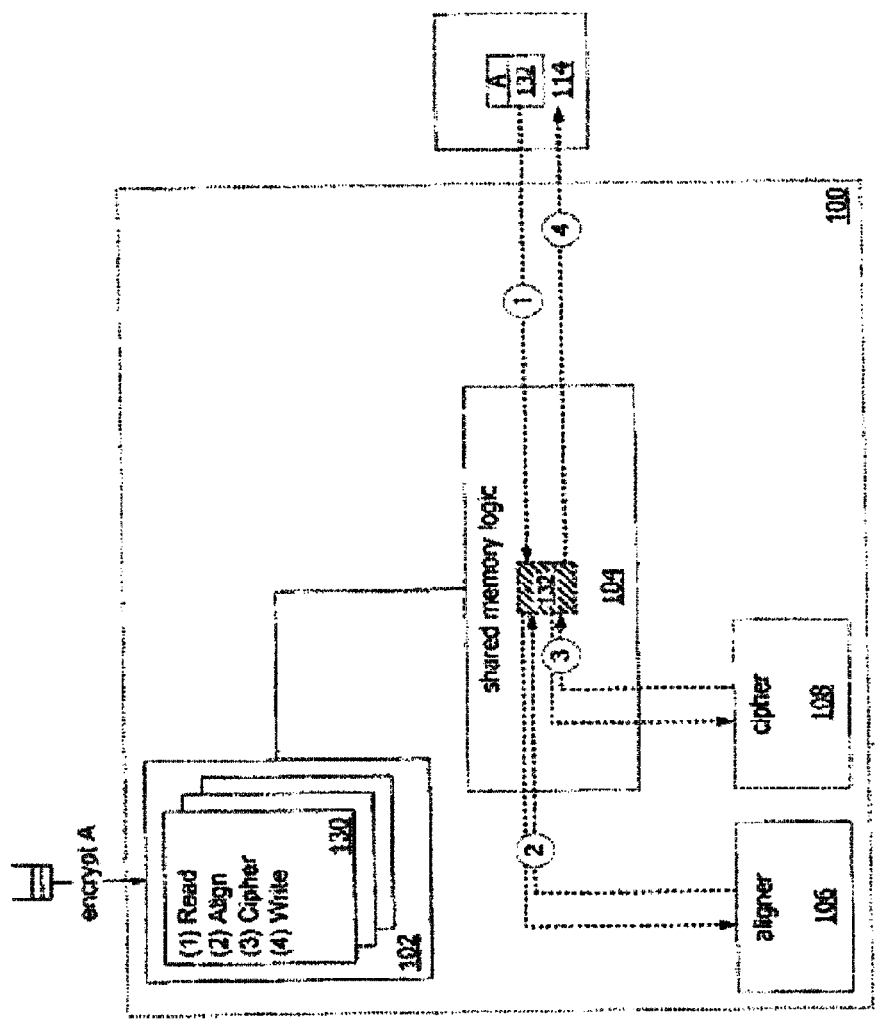
FIG. 2 illustrates processing of a command to encrypt a network protocol unit, in accordance with some embodiments of the present invention.

A program executed by the core 102 can perform a requested cryptographic operation in a single pass through program code. As an example, FIG. 2 illustrates processing of a command to encrypt network protocol unit "A" stored in RAM 114 by a program executed by core 102, in accordance with some embodiments of the present invention. For instance, another processor core (not shown) may send the command to component 100 to prepare transmission of network protocol unit "A" across a public network. As shown, the sample program: (1) reads the network protocol unit and any associated cryptography context (e.g., keys, initial vectors, or residue) into shared memory from RAM 114; (2) sends the data to an aligning processing unit 106 that writes the data back into shared memory 114 aligned on a specified byte boundary; (3) sends the data to a cipher processing unit 108 that performs a transformative cipher operation on the data before sending the transformed data to memory 104; and (4) transfers the transformed data to RAM 114. The core 102 may then generate a signal or message notifying the processor core that issued the command that encryption is complete.

The processor core 102 may be a multi-threaded processor core including storage for multiple program counters and contexts associated with multiple, respective, threads of program execution. The core 102 may switch between thread contexts to mask latency associated with processing unit 106-112 operation. For example, thread 130 may include an instruction (not shown) explicitly relinquishing thread 130 execution after an instruction sending data to the cipher processing unit 108 until receiving an indication that the transformed data has been written into shared memory 104. Alternately, the core 102 may use pre-emptive context switching that automatically switches contexts after certain events (e.g., requesting operation of a processing unit 106-112 or after a certain amount of execution time). Thread switching enables a different thread to perform other operations such as processing of a different network protocol unit in what would otherwise be wasted core 102 cycles. Throughput can be potentially be increased by adding additional contexts to the core 102. In a multi-threaded implementation, threads can be assigned to commands in a variety of ways, for example, by a dispatcher thread that assigns threads to commands or by threads dequeuing commands when the threads are available.

Figure 3:
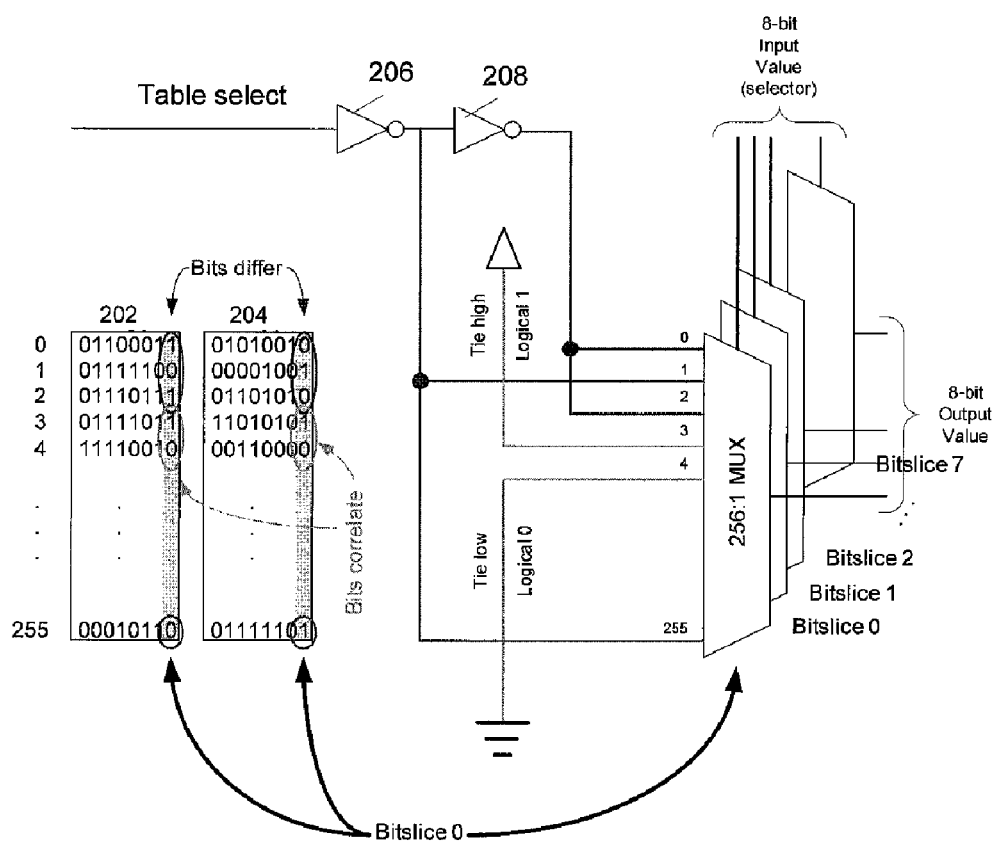
FIG. 3 shows an example system that can be used to store multiple tables, in accordance with some embodiments of the present invention.

Some embodiments of the present invention may overlay and merge any number of tables of equivalent size and structure. FIG. 3 shows an example system that can be used to store multiple tables, in accordance with some embodiments of the present invention. In the example of FIG. 3, tables 202 and 204 are shown. In this example, tables 202 and 204 are each 256 rows long and 8 bits wide, although any sizes of tables can be used and any number of tables may be combined.

In some embodiments, each bit at the same row and column position in each of the tables 202 and 204 with identical and constant value may be set to a voltage level. For example, logical '0' and '1' may be hard-wired to respective ground and Vcc, although other voltage levels may be used. In some embodiments, patterns of bits at the same row and column positions among tables 202 and 204 with identical and constant values may be represented as either ground or Vcc as respective logical '0' or '1'. Each bit at the same position in tables 202 and 204 that differs may be connected to two inverters 206 and 208 which are in series and the value for each bit generated using a table select signal feed through the inverters. In some embodiments, a single inverter may be used to provide an inverted signal and the non-inverted source signal may be provided directly without double inversion. For example, double inversion may be used where there are many inputs that are to be driven by the same signal (i.e., high fan-out).

In some embodiments, additional buffer-trees may be used depending in part on a number of copies of table select signals (or inverses of table select signals) to be used and the logic gate implementation (i.e., maximum "fan-out"). For example, assume two tables with 256 entries of 8-bit values are to be combined. For random table values, about 50% of bits in both tables share the same value. The rest of the table values are different and can be represented by either a "select" or "inverse select" signal. Accordingly, the select signal (and its inverse) are distributed to 0.5*8*256 (i.e., 1024) multiplexer inputs. As an example, for a maximum fan-out of four, a quaternary tree of inverters (buffers) is used: 1→4(i)→16→256(i)→41024, where (i) represents the inverted table select signal. Thus, even though a single inverter (or buffer) is limited to driving just a few inputs, a tree can be built with merely four levels of logic that can drive all of the inputs of the multiplexers.

The table select signal may be input to inverter 206. The output from inverter 206 may be an input to inverter 208. The output from inverter 206 may be output for a bit position when the stored differing bit is a '0' whereas the output from inverter 208 may be output from a bit position when the stored differing bit is a '1', although other schemes can be used. When table select signal is a '1', bits differing among tables 202 and 204 may be output for table 202. For example, the output from inverter 206 is provided as an output for each bit that is a '0' in table 202 whereas the output from inverter 208 is provided as an output for each bit that is a '1' in table 202. Conversely, when table select signal is a '0' then bits differing among tables 202 and 204 may be output for table 204. For example, the output from inverter 206 is provided as an output for each bit that is a '1' in table 204 whereas the output from inverter 208 is provided as an output for each bit that is a '0' in table 204.

For example, if table 202 represents an encryption table and table 204 represents a decryption table, then table select signal may be '1' to select encryption table and '0' to select a decryption table.

The merged look-up table resulting from tables 202 and 204 may include eight bit-slices (where each slice is a column), one slice for each bit of the 8-bit output vector. Each bit-slice may be implemented as a separate 256:1 multiplexer, routing values to the output based upon the 8-bit selector input value to select a row from a table. If tables have X columns and have $2^Y$ rows, then X number of multiplexers with $2^Y$ inputs and a Y-bit selector may be used. The Y-bit selector may be the portion of a network protocol unit that is to be encrypted or decrypted and can be an input of the S-Box. The information retrieved from the table may replace the portion of the network protocol unit that is to be encrypted or decrypted.

Embodiments can be generalized to cover the merging of an arbitrary number of look-up tables of equivalent size and structure. For example, if the number of look-up tables that are to be combined is N and N is a power of two, then $k=\log_2(N)$ signals may be used to select between the different table contents. If N is not a power of 2, the number of bits in a selector signal is log 2(N) rounded up to the next integer, i.e., k=cell(log 2(N)). Instead of only the encryption/decryption signal and its inverse, the table of look-up values for each bit of the merged table can be the evaluation of one of all $2^{2^k}$ possible Boolean functions over the k selector variables. For example, for the merging of up to 4 tables, k=2, and each of the table value inputs to the multiplexers is provided with the result of one of 16 possible Boolean functions over two inputs (e.g., AND, OR, NAND, NOR, XOR, XNOR, Implication, and so forth), depending on the particular value of the bits at each same location of the different tables.

The following describes an example for merging four tables having 4 bit entries using two table select signals (only the first four table entries are listed):

| | |
|---|---|
| Table 0: | value[0] = 0, value[1] = 13, value[2] = 6, value[3] = 8, value[4] = . . . |
| Table 1: | value[0] = 4, value[1] = 1, value[2] = 5, value[3] = 11, value[4] = . . . |
| Table 2: | value[0] = 7, value[1] = 2, value[2] = 9, value[3] = 14, value[4] = . . . |
| Table 3: | value[0] = 12, value[1] = 3, value[2] = 10, value[3] = 15, value[4] = . . . |

If, for example, the index into the look-up table is "2", then the value at the output should be either "6", "5", "9", or "10", depending on the two table select signals.

The following is a representation of table values in binary form and includes table select signal values arbitrarily named "select_a" and "select_b":

| | | | |
|---|---|---|---|
| Table 0: | value[2] = 0110 | select_a = 0 | select_b = 0 |
| Table 1: | value[2] = 0101 | select_a = 0 | select_b = 1 |
| Table 2: | value[2] = 1001 | select_a = 1 | select_b = 0 |
| Table 3: | value[2] = 1010 | select_a = 1 | select_b = 1 |

Note that the values of the most significant bits (slice 3) coincide with the value of select_a and those of the second most significant bits (slice 2) coincide with its inverse. For the remaining two columns (bit slices 1 and 0), the respective expressions "select_a XNOR select b" and "select_a XOR select_b" can be used.

The following is an example for index=3. For convenience, select_a and select_b are represented as respective A and B, and indicate the bit slices individually with a secondary index:

| | |
|---|---|
| Table 0 (A = 0, B = 0): | value[3][3] = 1, value[3][2] = 0, value[3][1] = 0, value[3][0] = 0 |
| Table 1 (A = 0, B = 1): | value[3][3] = 1, value[3][2] = 0, value[3][1] = 1, value[3][0] = 1 |
| Table 2 (A = 1, B = 0): | value[3][3] = 1, value[3][2] = 1, value[3][1] = 1, value[3][0] = 0 |
| Table 3 (A = 1, B = 1): | value[3][3] = 1, value[3][2] = 1, value[3][1] = 0, value[3][0] = 1 |

In this example the following expressions can be made: Value [3][3]=1, value[3 ][2]=A, value[3][1]=A xor B, value[3][0]=B.

Using this technique up to four arbitrary tables can be merged into a single look-up table. The inputs to the multiplexer can be generated by a simple binary (2-input) Boolean expression. The same expression (or its inverse) may be used for multiple entries in the table by distributing its value to the corresponding multiplexer inputs via a buffer (or inverter) tree.

Figure 4:
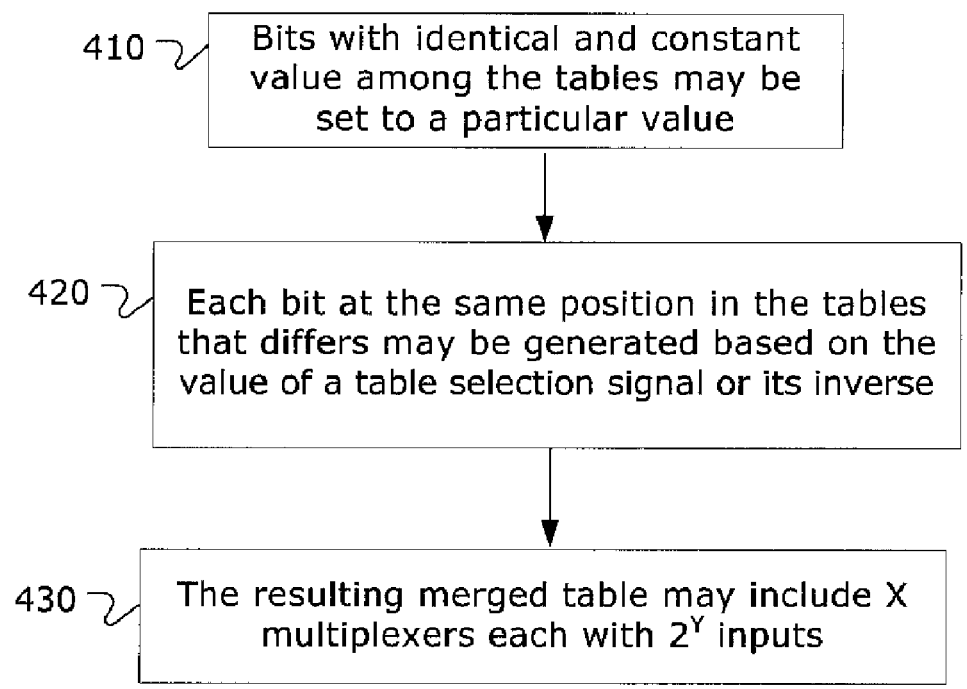
FIG. 4 depicts a process that can be used to merge multiple tables, in accordance with some embodiments of the present invention.

FIG. 4 depicts a process that can be used to merge and store multiple tables, in accordance with some embodiments of the present invention, In block 410, bits with identical and constant value and at the same row and column position among each of the tables may be set to a particular voltage value. For example, for logical '0', the value may be ground whereas for logical '1', the value may be Vcc, although other voltage levels may be used. In some embodiments, patterns of bits at the same row and column positions among tables with identical and constant values may be represented as either ground or Vcc as respective logical '0' or '1'.

In block 420, each bit at the same position in the tables that differs may be generated based on the value of a table selection signal or its inverse. For example, an inverter may be used to generate an inverse of a table selection signal. The table selection signal may be used to select the table that is among the merged tables. For example, if two merged tables represent encryption and decryption tables, then the table selection signal may select either the encryption or decryption table.

In block 430, the resulting merged tables may include X multiplexers each with $2^Y$ inputs, where X is a number of bits in each row and Y is a number of rows in each table.

Figure 5:
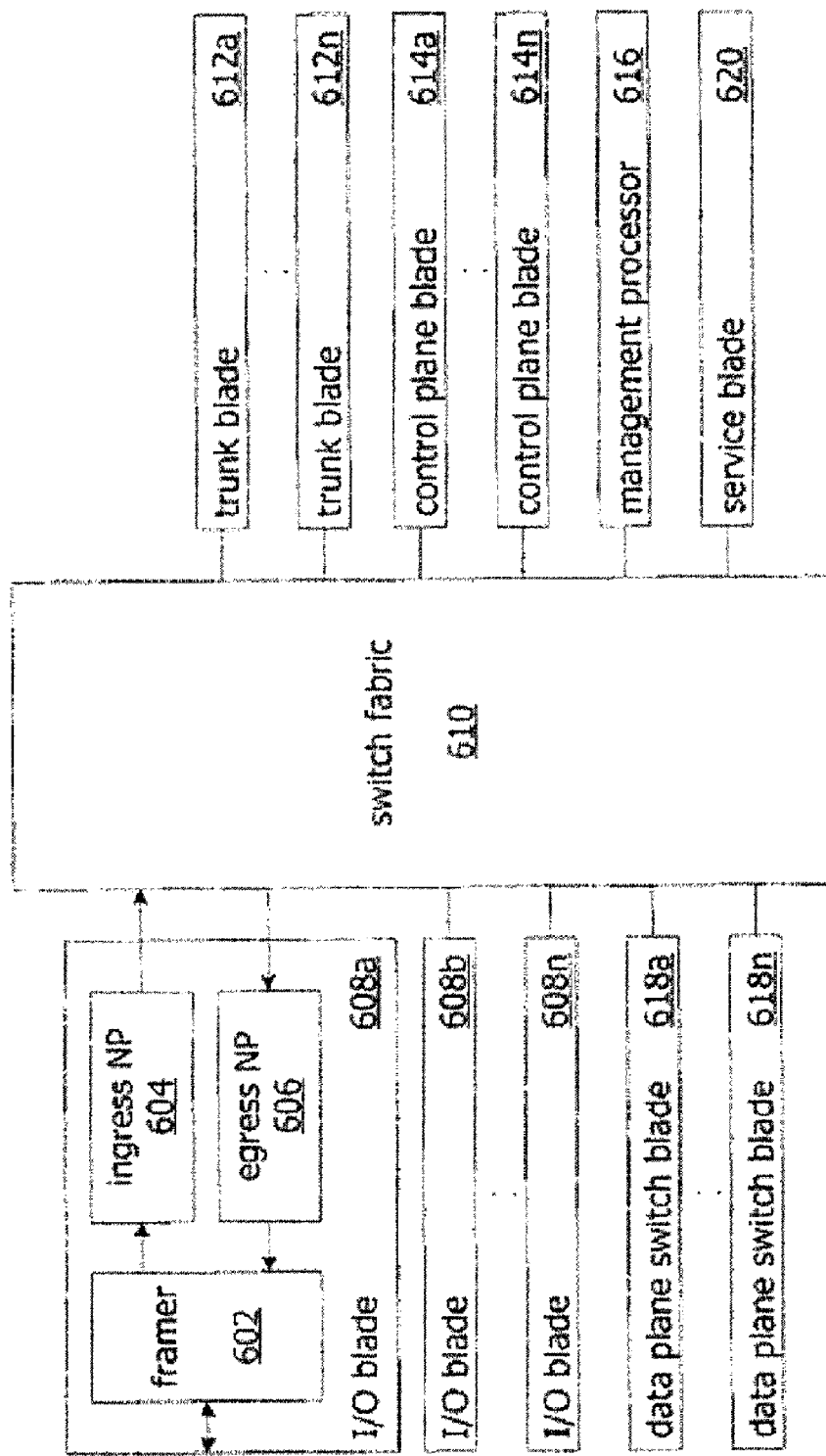
FIG. 5 depicts a network device that can process network protocol units using cryptography logic, in accordance with some embodiments of the present invention.

FIG. 5 depicts a network device that can process network protocol units using cryptography logic, such as but not limited to that described with regard to FIG. 1, in accordance with some embodiments of the present invention. As shown, the device features a collection of blades 608-620 holding integrated circuitry interconnected by a switch fabric 610 (e.g., a crossbar or shared memory switch fabric). As shown the device features a variety of blades performing different operations such as I/O blades 608a-608n, data plane switch blades 618a-618b, trunk blades 612a-612b, control plane blades 614a-614n, and service blades. The switch fabric, for example, may conform to CSIX or other fabric technologies such as HyperTransport, Infiniband, PCI, Packet-Over-SONET, RapidIO, and/or UTOPIA (Universal Test and Operations PHY Interface for ATM).

Individual blades (e.g., 608a) may include one or more physical layer (PHY) devices (not shown) (e.g., optic, wire, and wireless PHYs) that handle communication over network connections. The PHYs translate between the physical signals carried by different network mediums and the bits (e.g., "0"-s and "1"-s) used by digital systems. The line cards 608-620 may also include framer devices (e.g., Ethernet, Synchronous Optic Network (SONET), High-Level Data Link (HDLC) framers or other "layer 2" devices) 602 that can perform operations on frames such as error detection and/or correction. The line cards 608-620 may also include cryptography features. The blades 608a shown may also include one or more network processors 604, 606 that perform network protocol unit processing operations for network protocol units received via the PHY(s) 602 and direct the network protocol units, via the switch fabric 610, to a blade providing an egress interface to forward the network protocol unit. Potentially, the network processor(s) 606 may perform "layer 2" duties instead of the framer devices 602. The network processors 604, 606 may feature techniques described above.

Embodiments of the present invention may be implemented as any or a combination of: one or more microchips or integrated circuits interconnected using a motherboard, hard-wired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
    receiving a row selection signal to access information stored within a selected table, wherein the selected table is stored as a combination of the selected table and at least one other table;
    providing information from the row based in part on the row selection signal and a table selection signal, wherein each bit in the same position among the combination of tables that is the same is stored as a voltage level and wherein each bit in the same position among the combination of tables that is different is based on the table selection signal or an inverse of the table selection signal; and
    storing the combination of tables using X multiplexers each with $2^Y$ inputs, wherein X is a number of bits in each row and Y is a number of rows in each table among the combination of tables.

2. The method of claim 1, wherein the selected table is chosen from among a group consisting of an encryption table and decryption table.

3. The method of claim 2, wherein the selected table is used in a substitution box operation.

4. The method of claim 1, further comprising storing the combination of tables using at least one multiplexer, wherein each multiplexer is to receive inputs of each row of the combination of tables, wherein the multiplexer receives an input selected from among a first voltage node and a second voltage node when the bit in the same position among the tables is the same, and wherein the multiplexer receives an input selected from among a table selection signal and its inverse when the bit in the same position among the combination of tables is different.

5. The method of claim 1, further comprising requesting encryption of a network protocol unit and replacing a portion of the network protocol unit with content retrieved from a table.

6. The method of claim 1, further comprising requesting decryption of a network protocol unit and replacing a portion of the network protocol unit with content retrieved from a table.

7. An apparatus to store multiple tables within a single table, the apparatus comprising:
    an inverter to invert a table select signal and provide an inverted table select signal;
    a first voltage node to indicate a first level of each bit in the same position among the tables that is the same;
    a second voltage node to indicate a second level of each bit in the same position among the tables that is the same; and
    at least one multiplexer, wherein each multiplexer is to receive inputs of each row of the tables, wherein each multiplexer receives an input selected from among the first voltage node and the second voltage node when the bit in the same position among the tables is the same, and wherein each multiplexer receives an input selected from among a table selection signal and its inverse when the bit in the same position among the tables is different.

8. The apparatus of claim 7, wherein a selector signal selects which input row of the at least one multiplexer is output.

9. The apparatus of claim 7, wherein at least one of the tables is an encryption table and wherein at least one of the tables is a decryption table.

10. The apparatus of claim 9, wherein at least one of the tables is used in a substitution box operation.

11. The apparatus of claim 7, wherein at least one multiplexer comprises X multiplexers each with $2^Y$ inputs, wherein X is a number of bits in each row and Y is a number of rows in each table among the combination of tables.

12. The apparatus of claim 7, further comprising:
    logic to receive a request to encrypt a network protocol unit;
    logic to request access to a table; and
    logic to replace a portion of the network protocol unit with content retrieved from the accessed table.

13. The apparatus of claim 7, further comprising:
    logic to receive a request to decrypt a network protocol unit;
    logic to request access to a table; and
    logic to replace a portion of the network protocol unit with content retrieved from the accessed table.

14. A system comprising:
    a switch fabric and
    a device communicatively coupled to the switch fabric, wherein the device includes:
        cryptography logic to encrypt or decrypt a signal based in part on a selected table, wherein the cryptography logic is to identify the selected table, and
        logic to store the selected table, wherein the selected table is
        stored as a combination table with at least one other table, wherein each bit in the same position among the tables that is the same is stored as a voltage level and wherein each bit in the same position among the tables that is different is based on a value of a table selection signal or its inverse.

15. The system of claim 14, further comprising a blade communicatively coupled to the switch fabric, wherein the blade includes a capability selected from a group consisting of: physical layer processing, framing, network protocol unit processing, and cryptography.

16. The system of claim 14, wherein the cryptography logic is to comply at least with an Advanced Encryption Standard.

17. The system of claim 14, wherein the combination table stores at least a table capable of use for encryption and a table capable of use for decryption.

18. The system of claim 14, further comprising:
logic to receive a request to encrypt a network protocol unit;
logic to request access to a table; and
logic to replace a portion of the network protocol unit with content retrieved from the accessed table.

19. The system of claim 14, further comprising:
logic to receive a request to decrypt a network protocol unit;
logic to request access to a table; and
logic to replace a portion of the network protocol unit with content retrieved from the accessed table.

* * * * *